(12) United States Patent
Devereux et al.

(10) Patent No.: US 12,056,335 B2
(45) Date of Patent: *Aug. 6, 2024

(54) FLEXIBLY IDENTIFYING AND PLAYING MEDIA CONTENT FROM ANY WEBPAGE

(71) Applicant: Microsoft Technology Licensing, LLC, Redmond, WA (US)

(72) Inventors: William Devereux, Kirkland, WA (US); Erica Cheshier, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,145

(22) Filed: Apr. 10, 2023

(65) Prior Publication Data

US 2023/0289044 A1 Sep. 14, 2023

Related U.S. Application Data

(63) Continuation of application No. 17/930,317, filed on Sep. 7, 2022, now Pat. No. 11,656,745, which is a continuation of application No. 17/587,853, filed on Jan. 28, 2022, now Pat. No. 11,467,716.

(51) Int. Cl.
*G06F 3/0484* (2022.01)
*G06F 40/14* (2020.01)
*G06F 40/166* (2020.01)

(52) U.S. Cl.
CPC .......... *G06F 3/0484* (2013.01); *G06F 40/14* (2020.01); *G06F 40/166* (2020.01)

(58) Field of Classification Search
None
See application file for complete search history.

(56) References Cited

U.S. PATENT DOCUMENTS

| | | | | |
|---|---|---|---|---|
| 7,356,761 | B2 * | 4/2008 | Karadimitriou | G06F 16/9535 |
| | | | | 706/45 |
| 9,158,846 | B2 * | 10/2015 | Radlinski | G06F 16/951 |
| 10,108,735 | B2 * | 10/2018 | Dingwall | G06F 16/972 |
| 10,709,980 | B2 * | 7/2020 | Posin | A63F 13/35 |
| 10,922,364 | B2 * | 2/2021 | Cheng | G06F 16/955 |
| 11,467,716 | B1 * | 10/2022 | Devereux | G06F 40/166 |
| 2007/0072678 | A1 * | 3/2007 | Dagres | G07F 17/32 |
| | | | | 463/42 |

(Continued)

*Primary Examiner* — Maikhanh Nguyen

(57) ABSTRACT

Provided is a method, performed by a web browser, for identifying and displaying content, the method including receiving a webpage including text, comparing the text to titles of media content in a media content database, based on the comparison, identifying a subset of text as a match to a title of a matching media content, based on identifying the subset of text, modifying a display of the webpage by inserting a visual indicator into the webpage in proximity to the subset of text, or modifying the display of the subset of text, detecting an interaction of a user-controlled input with the inserted visual indicator or the modified display of the subset of text, and displaying a popup interface over a portion of the webpage, the popup interface displaying additional information about the matching media content and a selectable user-interface element to play the matching media content.

20 Claims, 8 Drawing Sheets

(56) References Cited

U.S. PATENT DOCUMENTS

| | | | | |
|---|---|---|---|---|
| 2010/0083179 A1* | 4/2010 | Decker | ............... | G06F 3/0483 |
| | | | | 715/830 |
| 2013/0024441 A1* | 1/2013 | Sun | ............... | G06F 16/951 |
| | | | | 707/E17.108 |
| 2013/0246047 A1* | 9/2013 | Vassilieva | ............ | G06F 40/295 |
| | | | | 704/9 |
| 2014/0179425 A1* | 6/2014 | Perry | ............... | A63F 13/63 |
| | | | | 463/31 |
| 2017/0173467 A1* | 6/2017 | Li | ............... | G06F 3/0481 |

\* cited by examiner

FLEXIBLY IDENTIFYING AND PLAYING MEDIA CONTENT FROM ANY WEBPAGE

CROSS-REFERENCE TO RELATED APPLICATIONS

This application is a continuation of U.S. patent application Ser. No. 17/930,317, filed on Sep. 7, 2022, which is a continuation of U.S. patent application Ser. No. 17/587,853 filed on Jan. 28, 2022, now Issued U.S. Pat. No. 11,467,716, both entitled "Flexibly Identifying and Playing Media Content from any Webpage," and which applications are incorporated herein by reference in their entireties.

BACKGROUND

As information and content available on the Internet increases, it can be difficult for users to efficiently find and access relevant media content related to a current webpage. Furthermore, a greater number of clicks and lengthier search paths separating users from their desired media content may result in network traffic congestion. For instance, when user reads a webpage about media content, such as a video game, the user may become interested in the media content. Discovering the actual media content itself, particularly legitimate versions of that media content, is cumbersome due to technical limitations and leads to significant wastes of computing and/or networking resources in processing searches for the media content.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology provides improved systems and methods for discovering, by a web browser, references to media content within received websites and providing interactive functionality to allow for immediate, or almost immediate, playing of the media content. For instance, advanced entity extraction may be used to identify a subset of text on a first webpage that matches content in a content catalog (e.g., a game title in a cloud gaming service catalog, a movie title in a movie streaming service catalog, or a song title in a music streaming service catalog). Alternate content names (e.g., abbreviations, partial substring matches, shorthand) may also be recognized as identifying or helping to identify and enable the playing of the media content from the web page. Confirmation or determination of a match to media content may also be based on additional content from the webpage, such as additional text surrounding the subset of text that matches the media content.

In response to identifying the subset of text on the webpage that matches available media content, the browser may insert a visual indicator, such as a cloud-gaming icon, a movie-streaming icon, or a music-streaming icon into the display of the webpage, and/or modify the matching subset of text. Such modifications of the display of the webpage may be achieved by modifying the document object model (DOM) of the webpage, a hypertext markup language (HTML) of the webpage, or an extensible markup language (XML) of the webpage.

The modified subset of text and/or visual indicator may also introduce additional functionality to the displayed webpage. When a user interacts with the new link or icon, the browser displays a popup interface that includes additional information about the matching media content. The popup interface may also include a selectable user-interface element (e.g., a play-now button) to access the media content (e.g., to play the game) in the browser with relatively few clicks (e.g., one or two).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
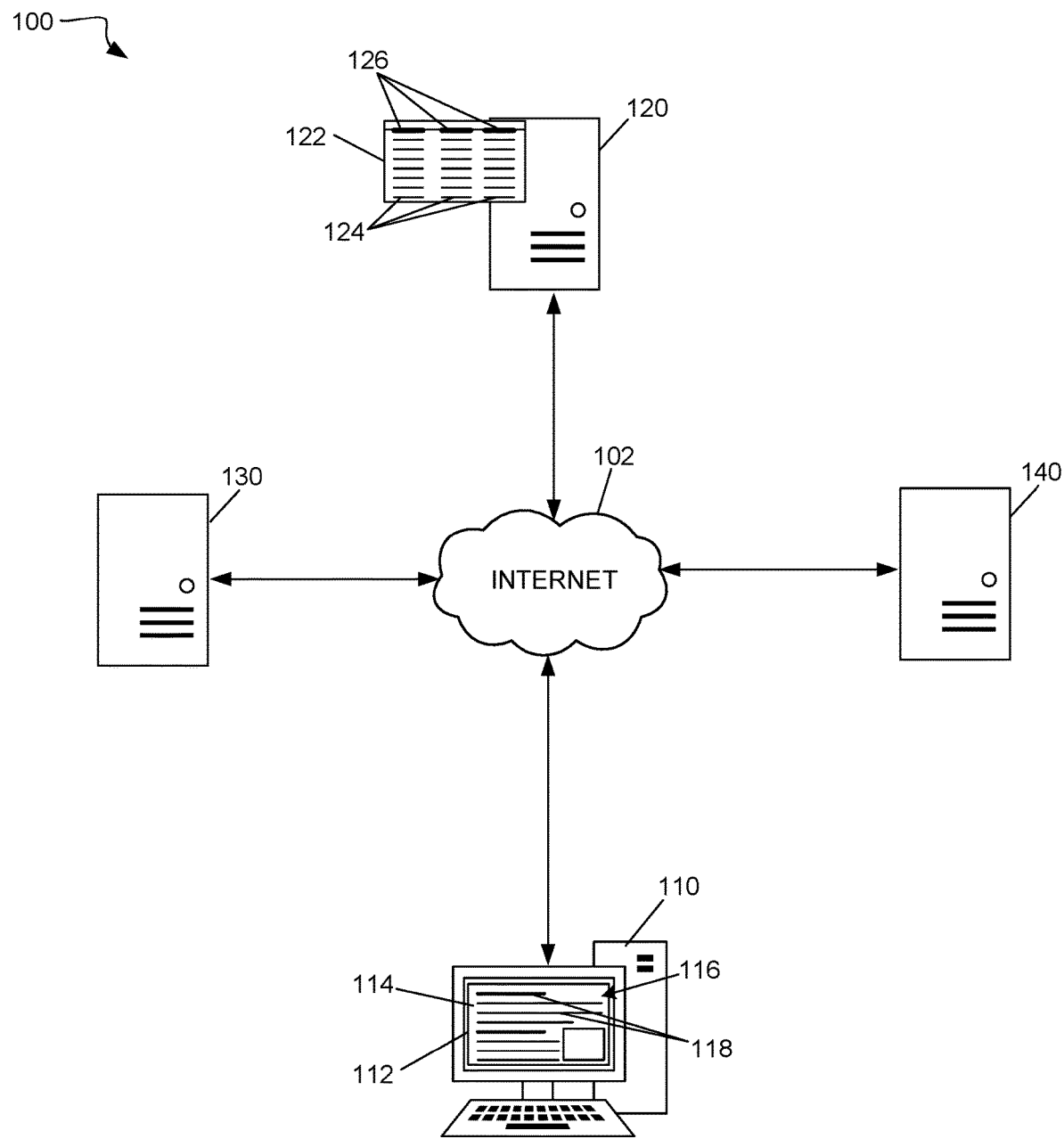
FIG. 1A depicts an example system for use in implementing a method for identifying and displaying content in a webpage.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

As briefly discussed above, as the amount of digital information and media content increases due to expanding technology capabilities, the ability to efficiently find and access such digital information and media content becomes increasingly difficult. For instance, such digital information and a media content may be stored on local devices and/or thousands of remote storage devices that are accessible via the Internet. As a user attempts to find the ever-increasing digital information and/or media content, a greater number of clicks and lengthier search paths separating users from their desired content results in increased network traffic congestion and requires greater input processing resources.

To help with this data discovery issue, webpage developers may provide hyperlinks to additional content related to the webpage. For example, a webpage developer may provide a hyperlink (e.g., an <a> tag) that, upon selection, causes a web browser to navigate to a new website indicated by the hyperlink. Such hyperlinks are useful in providing direct navigation to content, but such hyperlinks added by the web developer of a webpage are static and require additional effort by the web developer to add the hyperlinks upon creation of the webpage itself.

Due to an ever-changing availability of media content and an ever-increasing amount of media content, the presence of articles or web posts discussing such media content continues to change and expand at a rapid pace and static hyperlinks inserted by web developers into such webpages are not a reasonable solution to providing visibility to such content. As a result, discovering such content in the vast expanse of the Internet becomes an increasingly difficult technical challenge. For instance, search engines may index various websites that may be returned when a search for media content is executed, but those results may still return only articles, blogs, or other webpages related to the media content rather than the media content itself. Additionally, results from such search engines may not include locally stored media content.

Among other things, the present technology provides a technical solution to the data discovery problems and network congestion problems discussed above by augmenting the capabilities of web browsers that generally operate on a local device or client device. The web browser of the present technology scans the text of received webpages to identify subsets of text that match media content in a media database. The web browser may then modify the display of the webpage to visually indicate that the subset of text matches the media content. The web browser also provides interactivity to the modified display features to generate a popup interface that allows a user to directly interact with or play the media content from the webpage, and all of these features are completed without any required efforts from the developer of the webpage. Accordingly, the modifications to the webpage made by the web browser provide seamless access to play the media content without having to perform separate, cumbersome, and computationally expensive searches for that media content. As a result, media content may be more flexibly introduced to users across any webpage. Furthermore, web traffic may be more efficiently managed by reducing a number of clicks and a number of erroneous search paths between users and their desired content. Thus, among other things, the present technology may provide the advantage of a more efficient web browsing experience through a combination of entity extraction, automated insertion of content into an existing webpage, and direct playing of remote media content. Additionally, the present technology may enable Internet users to learn about media streaming services they may not have otherwise discovered, allow existing users of media streaming services to learn about more of the media content available in a service provider's media content catalog, and allow a web browser implementing the technology to become more useful and enjoyable to Internet users.

FIG. 1A depicts an example system 100 for use in implementing a method for identifying and displaying media content in a webpage. The system 100 may include a user computer 110 (e.g., a computing device or client device), such as a personal computer, smart phone, tablet, video game console, among other types of consumer computing devices. The user computer 110 may be one of many user computers 110 connected to the Internet 102.

The system 100 may include a media content provider 120. The media content provider 120 may be in the form of a server or remote computing device that stores (e.g., manages) a media content database 122. The media content database 122 may include media content that is stored for delivery (e.g., transmission) to the user computer 110 via the Internet 102. The media content database 122 may include one or more media content types 126 (e.g., games, movies, or songs). The media content database 122 may include a list (e.g., a catalog) of media content titles 124 corresponding to specific media content types 126 in the media content database 122 (e.g., a specific game, movie, or song).

As an example, the media content provider 120 may be a video game service that provides the ability to play online video games. In such an example, the catalog of media content titles 124 includes a listing of video game titles that are available to play through the video game service. In another example, the media content provider 120 may be a video streaming service that provides streaming movies, television shows, or other types of videos. In such an example, the catalog of media content titles 124 includes a listing of movie/show titles that are available to play through the video streaming service. While only one media content provider 120 is shown in system 100, it should be appreciated that multiple media content providers may be included in the system and connected to the Internet 102. For instance, a first media content provider may be the video game service and a second media content provider may be the video streaming service.

The system 100 may also include additional remote web servers, such as a first web server 130 and a second web server 140, that store and provide webpages over the Internet 102. For instance, the first web server 130 may provide a first set of webpages in response to requests to a first set of uniform resource locators (URLs), and the second web server 130 may provide a second set of webpages in response to requests to a second set of URLs. While only two web servers are shown in system 100, it should be appreciated that many more web servers are available and connected through the Internet 102.

The user computer 110 includes a web browser 112, which receives webpages from web servers, such as the first webserver 130 and/or the second webserver 140. For instance, in response to a URL request, the browser 112 receives a first webpage 114 including text 116. The web browser 112 then scans the text 116 to determine if a portion or subset of the text matches available media content. For example, the web browser 112 may scan a hypertext markup language (HTML) of the first webpage 114 or an extensible markup language (XML) of the first webpage 114.

The text 116 may include a subset of text 118 that is a portion of the text 116 that is less than all of the text 116 displayed on the first webpage 114. The web browser 112 may identify one or more subsets of text 118 as having a high probability of identifying a specific media content stored by, or available from, the media content provider 120. For example, the subset of text 118 may refer to (e.g., match or indicate a likelihood of a match with) media content in the media content database 122. A given subset of text 118 displayed on the first webpage 114 may be, or indicate, an exact match or a partial match (e.g., a possible match) with one of the media content titles 124. For instance, the subset of text 118 may be a partial substring match to a media content title, an alternate name of a media content title, a synonym of a media content title, a keyword in a media content title, an abbreviation of a media content title, a shorthand notation of a media content title, a nickname of a media content title, etc.

The web browser 112 may have access to identification information corresponding to the specific media content in the media content database 122. For example, the web browser 112 may have access to the content titles 124, along with corresponding media content types 126, abbreviations, nicknames, etc. The web browser 112 may be provided with the identification information corresponding to the media content during a one-time download or during periodic downloads from the media content provider 120. For example, a database of alternate names may be provided (e.g., hard coded) in a database of known alternate names, abbreviations, nicknames, synonyms, etc. when a new game is introduced. The web browser 112 may receive and download identification information, directly or indirectly, from the media content provider 120.

The web browser 112 may also, or alternatively, receive or generate identification information from, or based on, search engine queries. For example, the web browser 112 may gradually build, or add to, a database of identification information by collecting data indicating alternate ways of referring to specific media content. For example, as a new game, movie, or song becomes the subject of more discussion and search activity on the Internet, common terms, nicknames, or abbreviation may become increasingly associated with the specific game, movie, or song. The web browser 112 may gradually learn (e.g., via machine learning (ML) techniques or training) and include the common terms, synonyms, nicknames, or abbreviations into a database of identification information for the specific media content in a media content database 122.

The web browser 112 may also, or alternatively, receive or generate identification information based on media content locally stored on the user computer 110. For example, the web browser may include locally stored media content, such as movies, songs, video games, etc. The titles of that media content may be included as identification information used by the web browser 112 to identify matching text in web pages displayed by the browser 112.

When the browser 112 identifies a subset of text 118 that matches a title of media content, the web browser 112 modifies the display of the first webpage 114 to indicate the matched title. For instance, the browser 112 may modify the subset of text 118 and/or inject a visual element. A hyperlink and/or on-hover functionality may be incorporated into the subset of text 118 and/or injected visual element such that interaction with the subset of text 118 and/or injected visual element causes different responses from the web browser 112 as discussed further herein, such as providing a hover-card with information about the matched media content and/or providing direct access to the matching media content.

Figure 1B:
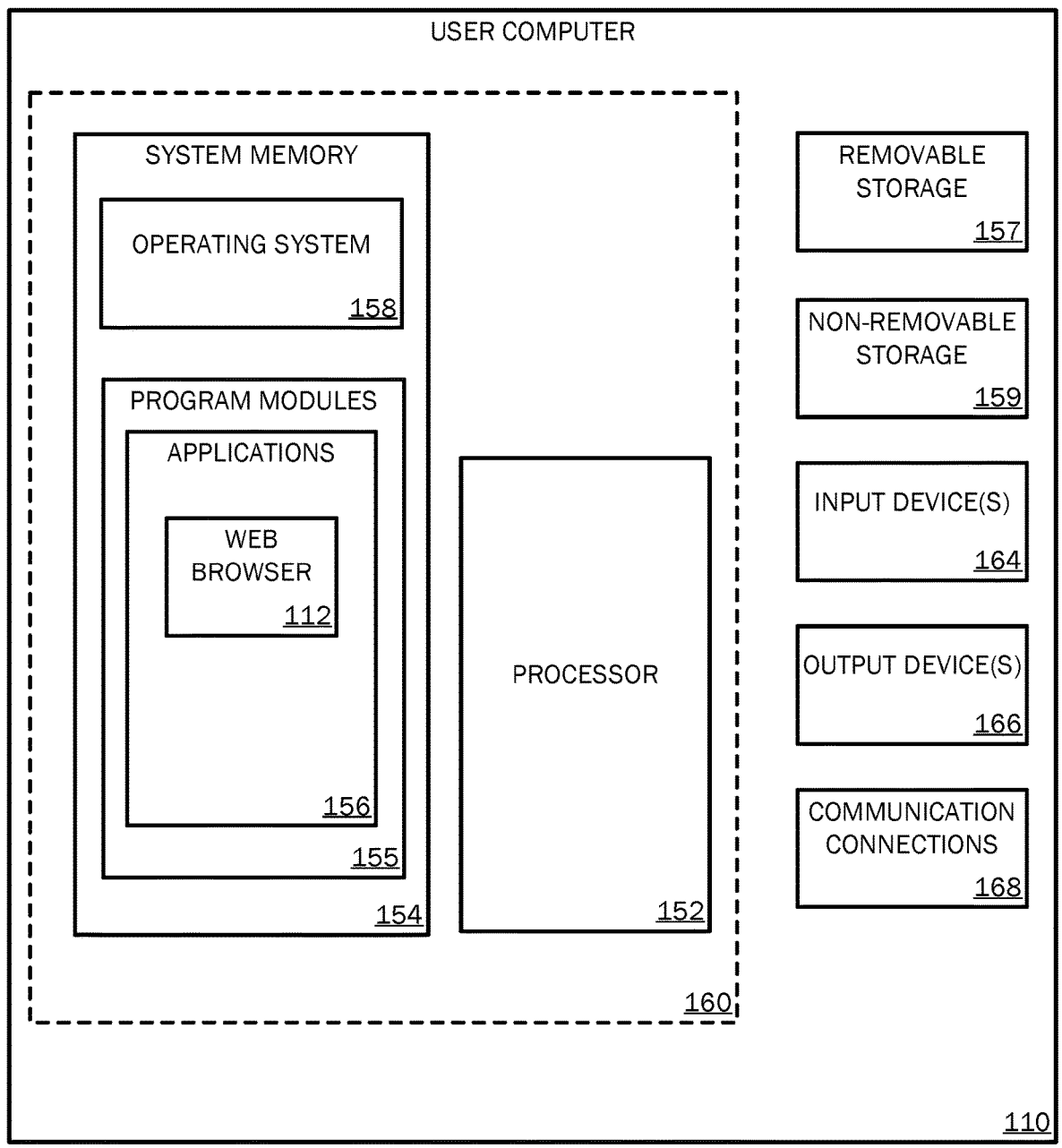
FIG. 1B is a block diagram illustrating example physical components of a computing device with which aspects of the present disclosure may be practiced.

FIG. 1B is a block diagram illustrating example physical components (e.g., hardware) of a user computer 110 (e.g., a computing device or client device) with which aspects of the present technology may be practiced. The computing device components described below may be suitable for the user computer 110 described above. In a basic configuration, the user computer 110 may include at least one processor 152 and memory 154 (e.g., system memory, removable memory, or non-removable memory). Depending on the configuration and type of computing device, the system memory may comprise, but is not limited to, volatile storage (e.g., random access memory), nonvolatile storage (e.g., read-only memory), flash memory, or any combination of such memories. The system memory may include an operating system 158 and one or more program modules 155 suitable for running software applications 156, such as the web browser 112.

The operating system 158, for example, may be suitable for controlling the operation of the user computer 110. Furthermore, aspects of the present disclosure may be practiced in conjunction with a graphics library, other operating systems, or any other application program and is not limited to any particular application or system. The removable and/or non-removable memory may include magnetic disks, optical disks, or tape. Such additional storage is illustrated in FIG. 1B by a removable storage device 157 and a non-removable storage device 159.

A number of program modules and data files may be stored in memory 154 (e.g., in the system memory). While executing on the processor 152, the program modules 155 may perform processes including, but not limited to, one or more of the operations of the methods 400 and 500 illustrated in FIGS. 4 and 5. Other program modules may be used in accordance with examples of the present disclosure and may include applications such as video game applications, music players, video players, electronic mail and contacts applications, word processing applications, spreadsheet applications, database applications, slide presentation applications, drawing or computer-aided application programs, etc.

Furthermore, examples of the technology may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 1B may be integrated onto a single integrated circuit. Such an SOC device may include one or more processors, graphics units, communications units, system virtualization units and various application functionality all of which are integrated (or "burned") onto the chip substrate as a single integrated circuit. When operating via an SOC, the functionality, described herein, with respect to identifying and displaying media content, may be operated via application-specific logic integrated with other components of the user computer 110 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The user computer 110 may also have one or more input device(s) 164 such as a keyboard, a mouse, a pen, a sound input device, a touch input device, a gaming controller, virtual reality (VR) devices, etc. For instance, the sound input device (e.g., microphone) may capture voice, which may be used to provide the selections and interactions discussed herein. The output device(s) 166 such as a display, speakers, a printer, etc. may also be included. The aforementioned devices are examples and others may be used. The user computer 110 may include one or more communication connections 168 allowing communications with other computing devices, such as the computing devices of system 100. Examples of suitable communication connections 168 include, but are not limited to, RF transmitter, receiver, and/or transceiver circuitry; universal serial bus (USB), parallel, and/or serial ports. The communication connections 168 may also provide communication with the Internet 102.

The term computer readable media as used herein may include computer storage media. Computer storage media may include volatile and nonvolatile, removable and non-removable media implemented in any method or technology for storage of information, such as computer readable instructions, data structures, or program modules. System memory 154, removable storage 157, and non-removable storage 159 (collectively "memory") are all computer storage media examples (i.e., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the user computer 110. Any such computer storage media may be part of the user computer 110. Computer storage media does not include a carrier wave or other propagated data signal.

Figure 2A:
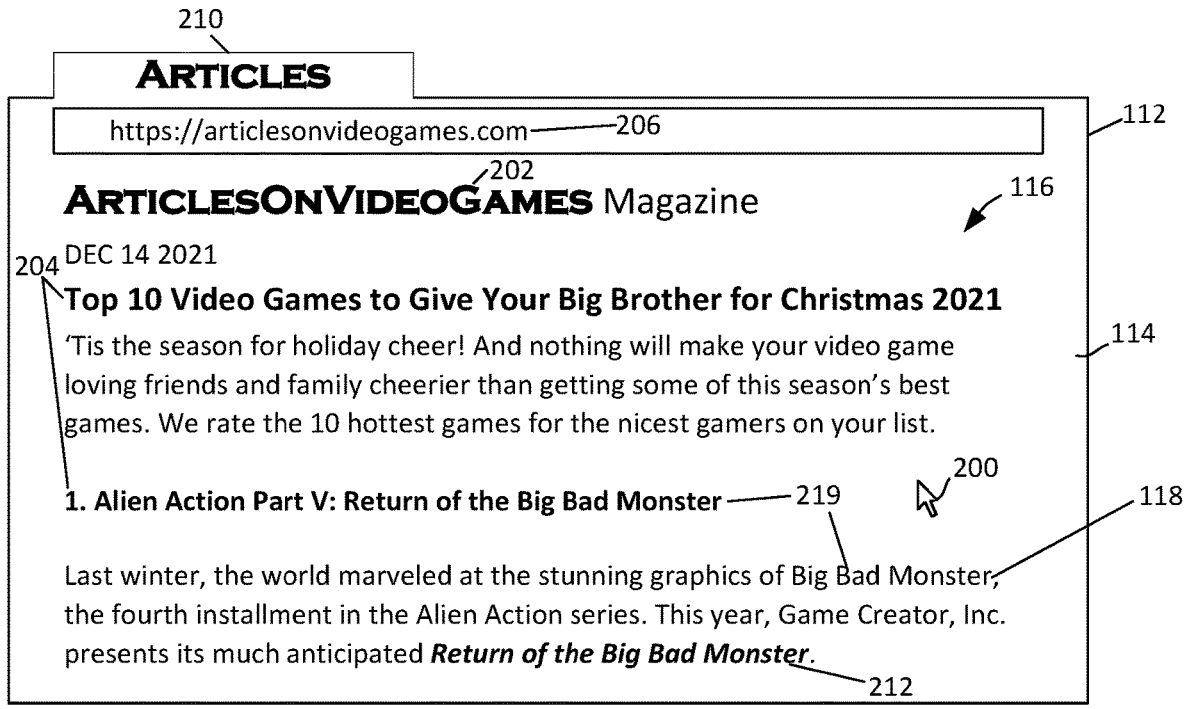
FIG. 2A depicts an example unmodified first webpage when a method for identifying and displaying content in a webpage is implemented.

FIG. 2A depicts an example unmodified first webpage 114 when a method for identifying and displaying content in a webpage is implemented. The web browser 112 receives a first webpage 114 including text 116. The first webpage 114 has a corresponding URL 206. The first webpage 114 may be displayed in a first tab 210 or window of the browser, and the browser 112 may display a user-controlled input indicator 200 (e.g., a cursor corresponding to a mouse or a touchscreen input).

The text 116 may include a subset of text 118 that is a portion of the text 116 that is less than all of the text 116 displayed on the first webpage 114. The text 116 may include any portion of the text within the HTML, XML, DOM, etc. for the webpage, such as a header 204, title, body text, headings, etc. The subset of text 118 may include any subset or portion of the text 116. Some portions of the subset of text 118 may include an existing activated text 212 (e.g., including a hyperlink and/or hovercard features). For example, a web developer may have programmed some portions of the text 116 to include a hyperlink (e.g., an <a> tag) to remote content or a hovercard with additional information corresponding to the existing activated text 212 that may be displayed without clicking a mouse button. Other portions of the subset of text 118 may include plain text.

The web browser 112 may scan the first webpage 114 to identify one or more subsets of text 118 that match, or possibly match, a title of media content from a listing of media content (e.g., a content catalog) that may include nicknames, abbreviations, alternative names, etc. Identifying a match, or potential match, may include a letter-by-letter comparison, a word-by-word comparison, or other types of textual comparison. The web browser 112 may also scan the text to identify entities in the text using entity extraction techniques that may be used for context in determining whether a match exists, as discussed further herein.

Figure 2B:
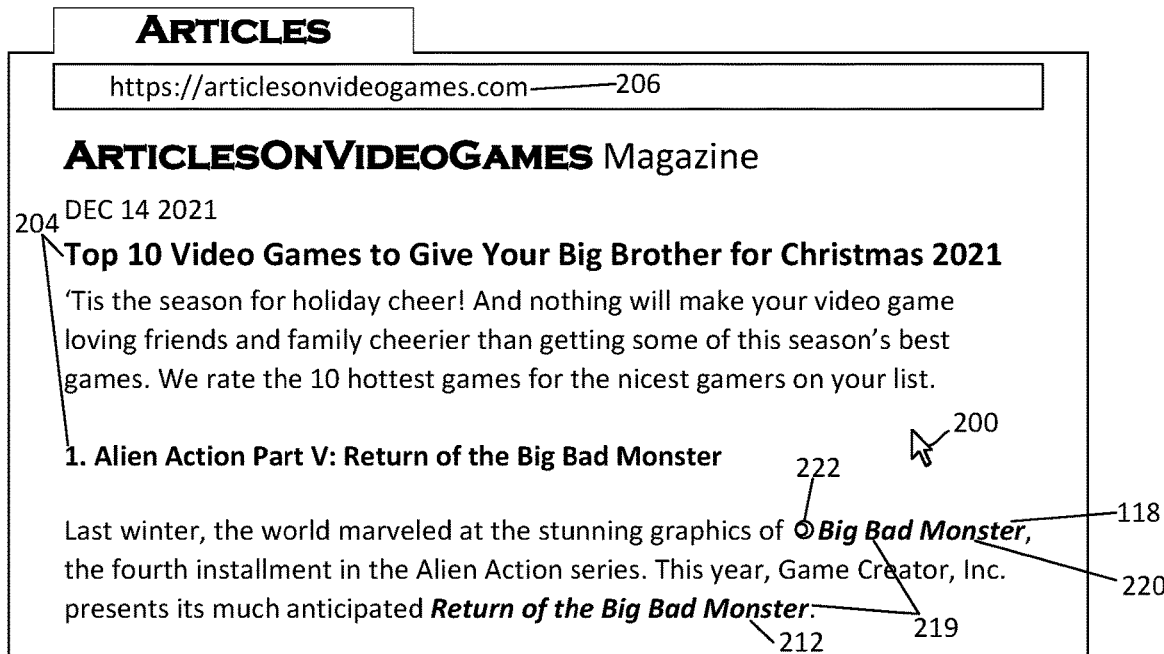
FIG. 2B depicts an example webpage as presented by a browser when a method for identifying and displaying content in a webpage is implemented.

FIG. 2B depicts the example of the first webpage 114 presented by a web browser 112 when a method for identifying and displaying content in a webpage is implemented. In the example depicted, a first subset of text 118 displayed on the first webpage 114 may be a match to a title of a matching media content 219. For example, the web browser 112 may receive the first webpage 114 and scan the included text 116. The web browser 112 may compare the text 116 to media content titles 124 from a media content database 122, and the browser may identify the subset of text 118 as a match to a specific media content title 124. In the example depicted, the subset of text 118 of "Big Bad Monster" matches a media content title 124 titled "BIG BAD MONSTER." Accordingly, the web browser 112 identifies the subset of text 118 corresponding to BIG BAD MONSTER as a match to the title of matching media content 219.

Based on identifying the subset of text 118 as a match, and to alert a user to the presence of a match to a title of matching media content 219, the web browser 112 modifies a display of the first webpage 114 in proximity to (e.g., near or at) the subset of text 118 corresponding to the matched media title (e.g., BIG BAD MONSTER). For instance, the matching subset of text 118 (e.g., BIG BAD MONSTER) may become a modified subset of text 220 (e.g., a different color than the surrounding text, italicized text, bolded text, underlined text) of the first webpage 114. Additionally, or alternatively, the web browser 112 may insert a visual indicator 222 (e.g., an icon) into the first webpage 114 in proximity to the subset of text 118. The visual indicator 222 may be an image or a font character. The web browser 112 may modify the display of the webpage 114 by modifying the document object model (DOM), HTML, and/or XML of the first webpage 114. Modifying the display of the webpage 114, however, does not change the actual webpage stored remotely, such as on a web server.

In addition to modifying the display of the webpage 114, when the web browser 112 detects a subset of text 118 matching media content, the web browser 112 may also make the modified subset of text 118 and/or the visual indicator 222 interactive. For example, the web browser 112 may incorporate a hyperlink and/or on-hover functionality with the modified subset of text 220 and/or the visual indicator 222 such that interaction with the modified subset of text 220 and/or the visual indicator 222 causes a response from the browser 112, such as navigation to the hyperlinked web page or display of a popup interface. For instance, when a hover input is received over the modified subset of text 220 and/or the visual indicator 222, a popup interface (e.g., hovercard) is displayed. Such modifications to add the interactivity may also be achieved by the DOM, HTML, and/or XML of the first webpage 114.

In some examples, the visual indicator 222 and the modified subset of text 220 may be styled to look like existing activated text 212 (e.g., other links) on the webpage 114, which may improve usability and readability. For example, the web browser 112 may use an HTML style that is already built into the first webpage 114 in determining a style of the inserted visual indicator 222 or modified subset of text 220. In some examples, the addition or modification of subset of text 118 the webpage 114 automatically inherits the properties of the other text 116 or activated text 212 due to the remainder of the DOM, HTML, XML, and/or cascading style sheet (CSS) code of the webpage 114. In some cases, if the display characteristics of the webpage 114 are not inherited or used, the modified text 220 and/or visual indicator 222 may not be able to be seen in some webpages. For instance, always using one color (e.g., green) to modify the display may cause the visual indicator 222 and/or the modified subset of text 220 to be illegible (e.g., invisible) on a webpage displaying a background of that same color (e.g., a green background). The visual indicator 222 may also be customized or modified to match the style of the modified subset of text 220.

To maintain the distinctive characteristics of the visual indicator 222, a single style version of the visual indicator 222 (e.g., an icon that identifies a particular brand and/or media content provider 120) may be used instead of adopting the built-in style of the first webpage 114. For instance, a white background may always be used behind the visual indicator 222 so that the distinctive characteristics of the visual indicator 222 may remain visible regardless of the background of a given webpage.

In some examples, the web browser 112 may determine that number of hyperlinks in the text 116 of the webpage 114 exceeds a threshold hyperlink number, such that additional similarly presented hyperlinks would lead users to become visually overwhelmed by additional hyperlinks due to modified subsets of text. In such cases, the modifications to the matching subset of text 118 and/or the visual indicator 222 characteristics may be made subtler to signal a match to a title of matching media content 219 but not overfill the webpage with apparent hyperlinks. For example, a dotted line below the subset of text 118, or another subtle symbol, may be used to signal that a match to a title of matching media content 219 is available in relation to the subset of text 118.

Additionally or alternatively, to avoid clutter and to be easier for a user to see, the web browser 112 may hyperlink and modify only the first best match to a title of matching media content 219 while leaving the remaining instances of the matching subset of text 118 in plain text. Similarly, the web browser 112 may always and/or only hyperlink and modify the subset of text matching the long form name of the specific media content because the long form name may be more likely to appear as the first instance of a match to a title of matching media content 219 on a webpage and is also more likely to be an exact match to a specific title. In addition, if the subset of text 118 that is a match to a title of matching media content 219 is associated with an existing hyperlink, the web browser 112 may avoid breaking the webpage 114 (e.g., avoid disabling existing functionalities of the webpage) by inserting only a visual indicator 222 next to the linked relevant subset of text 118 and leaving the pre-existing hyperlink intact. In other examples, the subset of text 118 may be modified to include the hover responses but the pre-existing hyperlink is left intact, as discussed further herein.

In some examples, matching subsets of text 118 may not be modified if they have certain formats or positions within the webpage 114. For example, if the matching subset of text 118 is in a header or heading, the matching subset of text 118 may not be modified. For instance, if there is a matching subset of text 118 in a header and in the body of the text (e.g., non-header), the matching subset of text 118 in the body may be modified while the matching subset of text in the header may be unmodified.

With respect to determining whether a subset of text 118 matches a tile of media content, as mentioned above, a partial substring match, a title, an alternate name, a synonym, a word, an abbreviation, a shorthand notation, a nickname, etc. may be used to help the web browser 112 identify a match to a title of matching media content 219. For example, a percentage match (e.g., a predetermined percentage match or matching threshold) between characters or words in a game title and an identified subset of text 118 may be used to infer that a possible match exists. For instance, a subset of text 118 may match 80% of media title, and a possible match may be identified. In some examples, if the percentage of subset of text 118 matching the media title exceeds a matching percentage threshold (e.g., 50%, 60%, 70%, 80%, 90%), the subset of text 118 may be identified as a possible match to the media title. As an illustrative example, in FIG. 2B the long form name of a game may be ALIEN ACTION PART V: RETURN OF THE BIG BAD MONSTER. The web browser 112 may determine that the percentage of matching letters and words in THE BIG BAD MONSTER on the webpage 114 exceeds a matching percentage threshold that indicates it is a possible match to the title in the media content database 122.

When a possible match is identified, the web browser 112 may analyze context relevant to possibly matching subset of text 118 to determine if the possibly matching subset of text is actually a match. The possibly matching subset of text 118 may be referred to as a candidate subset of text. The context may be generated from a variety of sources, including additional text 116 on the webpage 114, the address of the webpage, the platform of the webpage, prior browsing history of the user, and stored cookies, among other things, as discussed further below.

To identify the context of the possible match of a subset of text 118, the web browser may analyze additional text on the webpage 114. For instance, the web browser may analyze a surrounding sentence, paragraph, or section of the webpage in which the possible match was identified. If that surrounding text includes words or phrases that are related to the potentially matching title (e.g., descriptors of the title, mentions of video games or video game concepts where the title is a video game), the web browser 112 may identify the possible match as an actual match. The context may also be used to resolve a possible match of a subset of text to two different titles, which may be two different media types.

For example, if an identified subset of text 118 designated as a possible match to a title of matching media content 219 that corresponds to both an online gaming database and an online music database, another word in the paragraph (e.g., "video game") may be used by the web browser 112 to infer that the identified term refers to an online game, instead of a song. As an illustrative example, the term "Halo" is the title of a popular song and a popular video game, but the term "Halo" may also be a generic term referring to a disk or circle of light shown surrounding or above the head of a saint or holy person. The context surrounding the potential matching text of "Halo" may be used to resolve if the term is referring to media content, and in some examples, which type of media content the term refers.

Context may also be used to identify a specific version of multi-platform media content. For instance, video game content may be playable on several different types of platforms, such as on a console (e.g., an XBOX console), a PC, through a browser (e.g., web-based), a virtual reality headset, a mobile device, etc. The context may be used to resolve which of those platforms of the media content to which the possible match refers. For example, the surrounding text may include a phrase "on PC," which may be used to infer that the PC version of the game is being referred to by the matching or possible matching subset of text 118. In other words, the web browser 112 may use context from the webpage to determine a media content type 126 and a version of the content (e.g., to resolve both media type and proper media platform). To analyze the surrounding text, the web browser 112 may start searching text that is close in location to a possible match to a title of matching media content 219 then expand out. For example, the web browser 112 may first look at the sentence and identify context that may indicate whether the identified subset of text 118 is likely the matching media content.

The extraction of context and analysis of the surrounding text may be performed by machine-learning techniques that identify text as being indicative of certain media content. Alternatively or additionally, the web browser 112 may also include hard-coded rules and/or terms that, if present in the surrounding text, are indicative of media content and/or a particular type of media content. For example, a database of keywords such as "video game" or types of video game consoles or brands (e.g., XBOX) may be used to identify context within the surrounding text.

The proximity of the keywords or context relative to the possibly matching or candidate subset of text 118 may be used as a weight in determining whether there is an actual match and/or the type of content to which the possible match refers. For instance, the closer in proximity to the possible matching subset of text 118, the higher the weight. As an example, a keyword or context in the same sentence as the candidate subset of text 118 is given the highest weight, a keyword or context in the same paragraph, but not the same sentence, as the candidate subset of text 118 is given a middle weight (e.g., less than the highest weight), and a keyword or context on the page, but not in the same paragraph, as the candidate subset of text 118 is given the lowest weight (e.g., less than the middle weight).

As an illustrative example referring to FIG. 2B, the web browser 112 may execute one or more algorithms based on a keyword from the subset of text 118 to determine answers to various questions in resolving whether BIG BAD MONSTER refers to a video game or a movie. For example, the following example factors may be considered: (1) whether the keyword "video game" is in the sentence with BIG BAD MONSTER (if the keyword is in the sentence, the web browser 112 may determine that the probability is high that the identified text is a game); (2) whether the keyword is in the paragraph with BIG BAD MONSTER (if the keyword is not in the sentence but in the paragraph, the web browser 112 may determine that the probability is lower that "video game" indicates BIG BAD MONSTER is a game because the keyword could be related to another game or different identified subset of text); (3) whether the keyword is on the page but not in the paragraph; and (4) whether an identified domain or platform 202 (associated with the first webpage 114) is a gaming web site. Accordingly, the web browser 112 may weigh different types of context differently to determine the best match between an identified subset of text 118 and a specific media content.

In some examples, if an identified subset of text 118 (e.g., a partial game name) is not specific enough to identify the media from the multiple media titles having a similar name (e.g., games in a series), the web browser 112 may default to linking the identified subset of text 118 to the most recent content, such as the most recent game is a series. For instance, the game Alien Action may actually be a part of series that has a clear order (e.g., ALIEN ACTION I, II, III). Other series, however, may have titles that are not as clear as to the order of release (e.g., ALIEN ACTION: ALIENS INVADE, ALIEN ACTION: INVASION OF EARTH). In such examples, release dates may be used as context to identify a match to a title of matching media content 219 for a series. For instance, if the identified subset of text 118 is vague as to which game in the series is most relevant, the web browser 112 may provide information for the latest release based on the release date.

To make such a determination, the web browser 112 may use the release dates of the corresponding media content. The release dates may be provided in a content catalog by the content provider. Alternatively or additionally, release dates may be collected via a subsequent query when the possible match is identified. In other examples, the release dates may be queried when the database of game titles is initially downloaded, such that the release dates may all be gathered at one time instead of at every identification of a possible match The context may also include data associated with a cookie stored by the web browser 112, data associated with a browsing history stored by the web browser 112, and/or data associated with a source of advertisements to the web page 114. For example, a user may have previously visited a website from a known type of content provider (e.g., games, movies, or music), which may be indicated by a cookie and/or the user's browsing history. Advertisements on the webpage may also be analyzed to determine the source and/or content of the advertisement, and that source and/or content may be used as context to resolve whether a possible match is in fact a match and/or the type of media. For instance, an advertisement for a video game may be indicative that a possible match is actually a match to a media type of video games. In some examples, the use of some context, such as browsing history and/or cookies, may be limited or prevented by the user via user preferences or settings. For instance, a user may change a privacy setting to indicate which types of context is allowed and which type of context is not. Such settings may be opt-in or an opt-out.

Context relating to peripherals plugged into the computing device of the browser may also user to help identify a type of media for a possible match and/or a platform on which the media corresponds or should displayed. For example, a specific gaming controller or virtual reality (VR) device may be identified by the browser and used as context to identify the specific content and/or the corresponding platform of the content. For instance, video games may have a PC version, a cloud version, and a console version, among other potential versions. The device on which the browser is operating may inform which version should be provided for playing and the types of peripherals attached may also inform that determination.

To balance the costs associated using more context with the need for certainty in identifying the correct content, a tiered logic may be used to determine how much context will be analyzed for a possible match. For example, a known gaming website (e.g., ARTICLES ON VIDEO GAMES MAGAZINE) may indicate that the content on the page likely (e.g., almost certainly) refers to a game. In this case, less context may be used to determine a match. Also, a desired degree of certainty may be less in the case of determining whether an identified subset of text 118 on a gaming web site corresponds to, e.g., a game or a song, when the identified platform 202 is a gaming platform, because the user on the gaming website may likely be interested in an erroneously presented game. In contrast, a general purpose web site (e.g., a general shopping platform) may cause the web browser 112 to determine that more context should be gathered to determine a match because an identified subset of text 118 may be more likely to be unrelated to media content. Accordingly, the web browser 112 may determine a level of generality of a web site to determine a level of detail (or an amount) of context to analyze in determining a match. In other words, the web browser 112 may (1) identify and analyze more contextual detail if the website is more generic and (2) identify and analyze less contextual detail if the web site is less generic (e.g., more specific to a particular type of media). In some embodiments, if a matching media content is matched from multiple media service providers, the web browser 112 may show all service providers with different information (e.g., pricing, whether a subscription is needed) to distinguish one option from another.

Figure 2C:
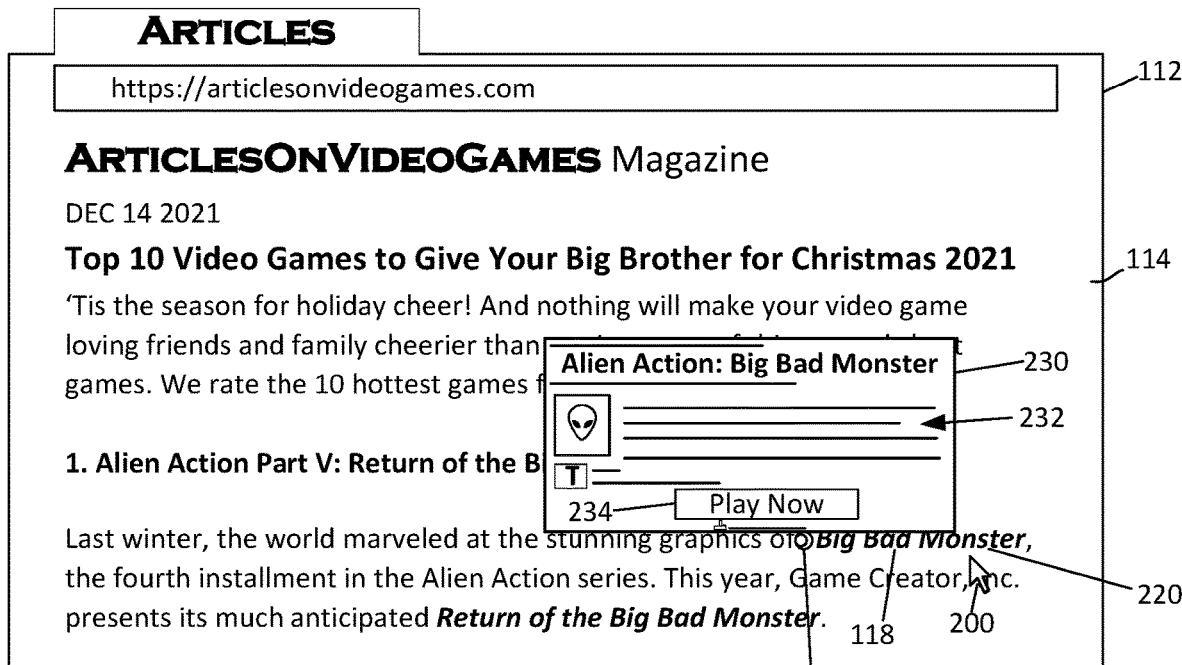
FIG. 2C depicts an example webpage presented by a browser when a method for identifying and displaying content in a webpage is implemented.

FIG. 2C depicts the example first webpage 114 as displayed by the browser when a method for identifying and displaying content in a webpage is implemented. Referring to FIG. 2C, the web browser 112 may display additional matching media content information 232 in a popup interface 230 (e.g., a hovercard, iFrame, or new floating mini-window rendered by the web browser 112) in the first webpage 114 based on detecting an interaction of a user-controlled input 200 (e.g., corresponding to a pointer of a mouse or a touchscreen) with the inserted visual indicator 222 and/or the modified subset of text 220. For example, if an interaction, such as a hover or a long press, with the visual indicator 222 and/or the modified subset of text 220, is detected, the browser 112 may display more information about the matching media content (e.g., the game) in the popup interface 230 (e.g., a small hover card) that is displayed as an overlay on the first webpage 114 based on the detected interaction.

interface 230 may be triggered by a pointer, by a long press on a touchscreen, or with a gaming controller, by hovering over a link. To avoid breaking pre-existing hyperlinks of the first webpage 114, if the matching subset of text 118 is already hyperlinked, the existing <a> tag may continue to work and users may access the popup interface 230 by hovering over the link. If, however, the matching subset of text 118 includes pre-existing on-hover behavior, that pre-existing on-hover behavior may not be changed such that the original functionality of the web page 114 remains intact. For instance, the original on-hover behavior is retained such that a user hover over the subset of text returns the original functionality rather than the popup interface 230 of the present technology. The inserted visual indicator 222, however, may still include the on-hover behavior of the present technology such that a hover over the inserted visual indicator 222 causes a display of the popup interface 230.

Table 1 (below) provides a summary of some examples of the present disclosure discussed above regarding how user interactions with the visual indicator 222 and the modified subset of text 220 may be implemented by the web browser 112 depending on the existing characteristics (e.g., pre-existing hyperlinks and/or on-hover functionality) of an identified subset of text 118 in the first web page 114. Each of the rows of Table 1 represents a state of the matching visual indicator 222 and the modified subset of text 220 based on whether there is an interaction with those elements or the element is at rest (e.g., no user interaction with the elements). Each column of Table 1 represents a pre-existing condition of the matching subset of text 118, such as whether it previously had an <a> tag (e.g., hyperlink) and/or on-hover functionality. The body of Table 1 thus represents the modifications and or response provided by the present technology.

TABLE 1

Matching Media Content Title and Icon Styling and Activation Matrix

| | Existing media content title has no <a> tag | Existing media content title has <a> tag | Existing media content title has styled <a> tag | Existing media content title has <a> tag with hover |
|---|---|---|---|---|
| At rest: Media content title | Style title to match default link color of webpage | No change from webpage | No change from webpage | No change from webpage |
| At rest: Icon | Style icon to match title | Style icon to match title | Style icon to match title | Style icon to match title |
| On hover: Media content title | Show popup interface | Show popup interface | Show popup interface | Show webpage's content on hover |
| On hover: Icon | Show popup interface | Show popup interface | Show popup interface | Show popup interface |
| On click: Media content title | Show popup interface | Follow webpage's <a> tag | Follow webpage's <a> tag | Follow webpage's <a> tag |
| On click: Icon | Show popup interface | Show popup interface | Show popup interface | Show popup interface |

The type of interactivity provided by inserted visual indicator 222 and/or the modified subset of text 220 may depend on the original state of the matching subset of text 118. For example, if the identified subset of text 118 (e.g., BIG BAD MONSTER) is not associated with an existing hyperlink, a hover or long press event on the modified subset of text 220 may trigger the web browser 112 to display the popup interface 230. In some embodiments, the popup The popup interface 230 may display the additional media content data 232 from a separate web page that is shown in the popup interface 230 and/or is used to retrieve data to populate the popup interface 230. For instance, the popup interface 230 may have some similarities to an iFrame. The separate web page may be a web page that is different from the first web page and also different from webpages provided by the media content provider 120. In other examples, the webpage in the popup interface 230 may be generated by the media content provider 120 (e.g., a cloud gaming service). This may allow users to see the most up-to-date information about the game and start playing (e.g., instantly start playing) with a small number of clicks (e.g., one or two clicks).

Figure 2D:
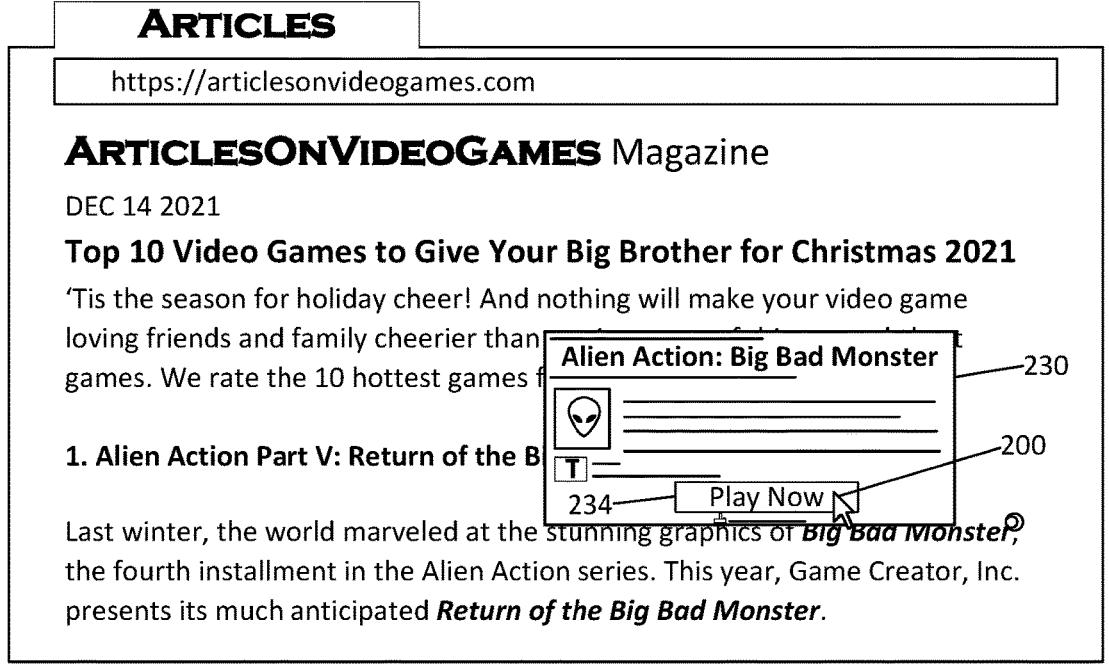
FIG. 2D depicts an example webpage presented by a browser when a method for identifying and displaying content in a webpage is implemented.

FIG. 2D depicts the first webpage 114 with the popup interface 230. In FIG. 2D, the cursor 200 has been moved over the selectable user-interface element 234 (e.g., Play Now button), in which user may select the button 234 to being playing the matching media content (e.g., the video game titled "Alien Action: Big Bad Monster").

Figure 2E:
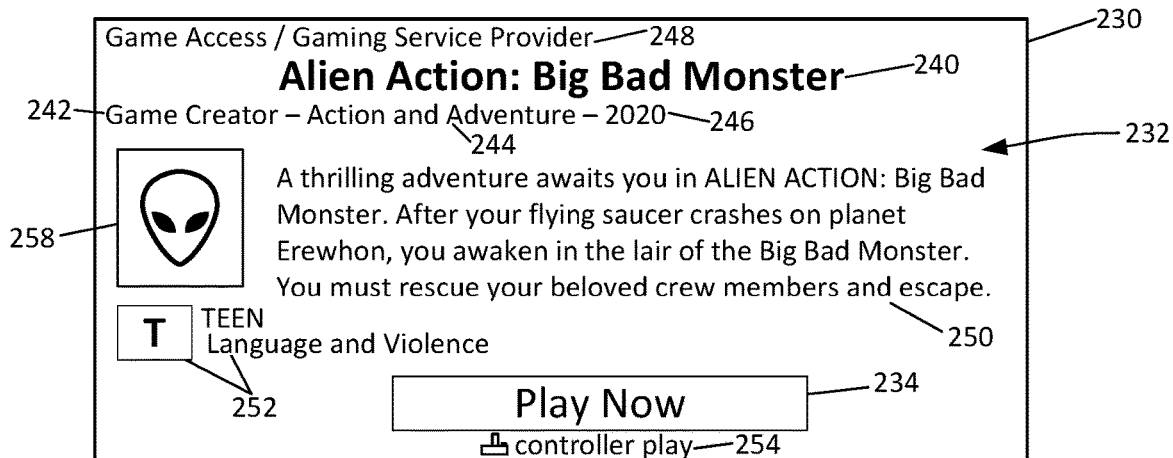
FIG. 2E depicts an example popup interface having detailed information.

FIG. 2E depicts a popup interface 230 having example detailed information about the matching media content. The popup interface 230 may provide the user with additional matching media content information 232, which may be provided by a media content provider 120 or another external source (e.g., a source that is different than the first webpage 114 or media content provider). The additional matching media content information 232 may include one or more of: a media content title 240, a source 242 of the matching media content, a genre 244 of the matching media content, release date and/or update date 246 associated with the matching media content, provider information 248 of the media content, a description 250 associated with the matching media content, information associated with a rating 252 of the matching media content, devices 254 available for use in playing the matching media content (e.g., game controllers, keyboards, VR headsets), and/or an image 258 associated with the matching media content (e.g., a game cover image, an album cover image).

Figure 2F:
FIG. 2F depicts an example popup interface having simplified information.

In some examples, the popup interface 230 may provide less information about the matching media content than what is provided in the example in FIG. 2E. FIG. 2F depicts a popup interface 230 having simplified information. By providing the simplified information, the relative size of the popup interface 230 may be made smaller to occlude less of the webpage 114 when the popup interface is displayed. The simplified information may include a shorter description and a larger image 258 associated with the matching media content. The selectable user-interface element 234 may notify users that the media content may Play In Your Browser to indicate that the matching media content may be played directly in the browser.

A selectable favorite user interface element 259 may also be displayed in the popup interface. When the favorite user interface element 259 is selected, the name or an indication of the matching media content is stored in a list or database managed by the browser 112 and/or the media content provided. Accordingly, if the user does not desire to immediate play the media content, but would like to later return to the media content, the user may select the favorite user interface element 259 and later return to the corresponding list.

Figure 2G:
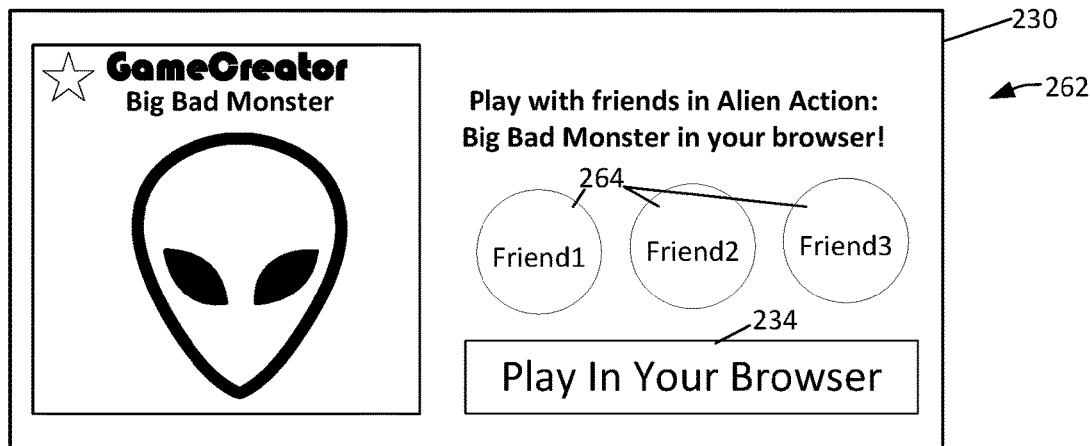
FIG. 2G depicts an example popup interface having information related to connecting with other users in playing matching media content.

FIG. 2G depicts a popup interface 230 having information related to connecting with other users in playing matching media content 262. In some examples, a popup interface 230 may include additional information related to connecting with other users in playing the matching media content may include information related to other users 264 associated with the matching media content. For example, such information may display avatars associated with friends currently playing the matching media content and may provide a mechanism for requesting a game with one or more friends.

The information about other users 264 may be generated from the media content provider 120. For example, where the user of the browser 112 is signed into the browser 112 and/or an account with the media content provider 120, a friend list or contacts of that user may be determined or accessed. Some media content provider 120 generate signals regarding which users are viewing or playing media content at any particular time. That signal may be used to generate the list of users 264 that are currently playing the matching media content 262, and that signal may be filtered or compared to the friend list or contacts of the user to generate the indicators of other users 264 in the popup interface. The user may also be able to control whether this information (e.g., friend lists, contacts) to limit or exclude its use. For instance, different levels (e.g., all users/player, friends only) may be selected via privacy settings, which may be opt-in or opt-out settings.

In an example, to provide the live view of current users 264 playing the matching media content, a query to the media content provider 120 may be generated upon identification of the matching subset of text 118 and/or when the hover interaction is detected. The query may indicate the identity of the user as well as the matching media content 262. The media content provider 120 may then provide a response to the query indicating the friends or users 264 that are playing the game.

Figure 3A:
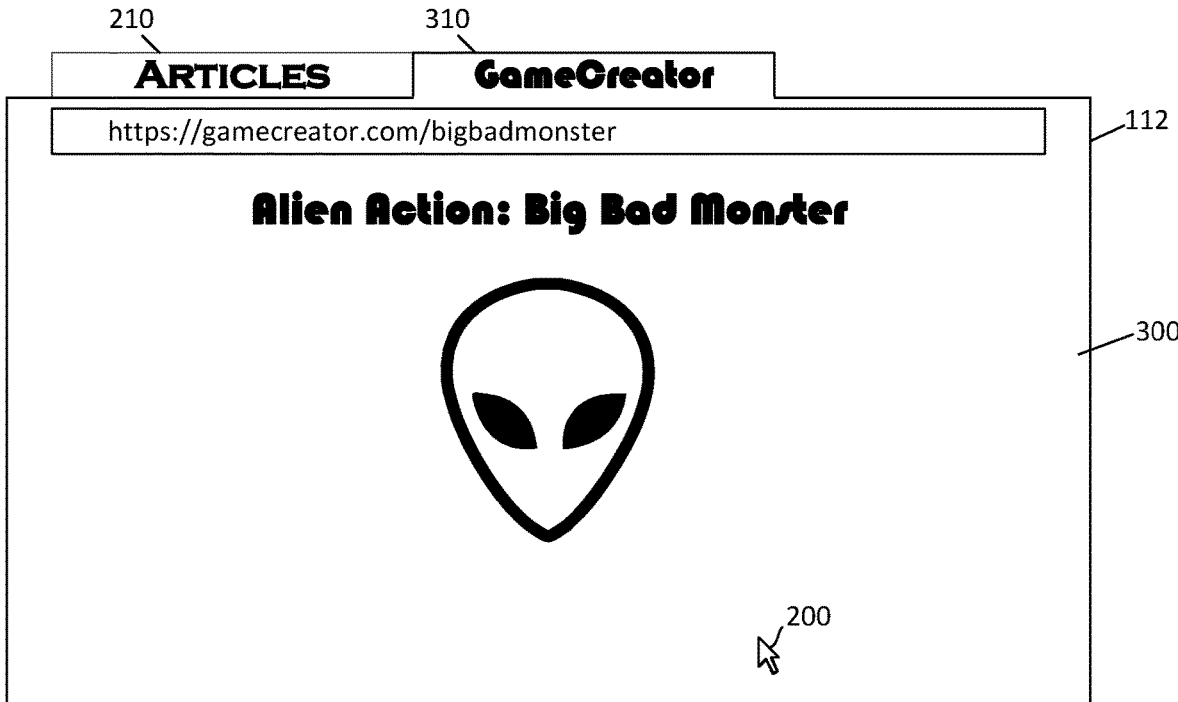
FIG. 3A depicts an example webpage displayed by a browser to play media content.

FIG. 3A depicts an example second webpage 300 as seen by a user when a selection of the selectable user-interface element 234 is received. For instance, the web browser 112 may receive a selection of the selectable user-interface element 234 in the popup interface 230 (e.g., the user may click the PLAY NOW or PLAY IN YOUR BROWSER button). In response to receiving the selection, the web browser 112 may play the matching media content. To allow for play of the matching media content, the web browser 112 may launch a new tab 310 (or a new browser window).

The second webpage 300 may be a webpage of the media content service provider. In some embodiments, the user may be presented with a play button in the new tab 310. The second webpage 300 may provide immediate playing of the matching media content without any further user interaction required. For instance, where the matching media content is a video game, the second webpage 300 provides the launched/activated gaming environments of the video game so that the user may begin immediately playing the content. In an example where the matching media content is a movie, the second webpage 300 may immediately being playing the second webpage 300 once the webpage is loaded by the browser 112. In some examples, the second webpage 300 includes another selectable play now user interface element (not shown) or other similar selectable element that may be selected by the user to play the matching media content.

The second webpage 300 is provided from the media content provider 120. In some examples, the second webpage 300 may be a specific website that is available only through selection of the selectable element 234 in the popup interface 230. For instance, the second webpage 300 may be tailored (e.g., special banner or other indicia) to reflect that the second webpage 300 has been reached specifically through selection of the selectable elements from the popup interface 230.

In some examples, the web browser 112 may pass the credentials of a user to the second webpage 300 to allow for the user to be authenticated by the media content provider 120. The credentials may be that of a single sign-on service that is shared between the browser 112 and/or credentials that are stored by the browser. By providing the credentials, the browser 112 and/or the media content provider 120 is able to facilitate a quicker playback or play of the matching media content.

Figure 3B:
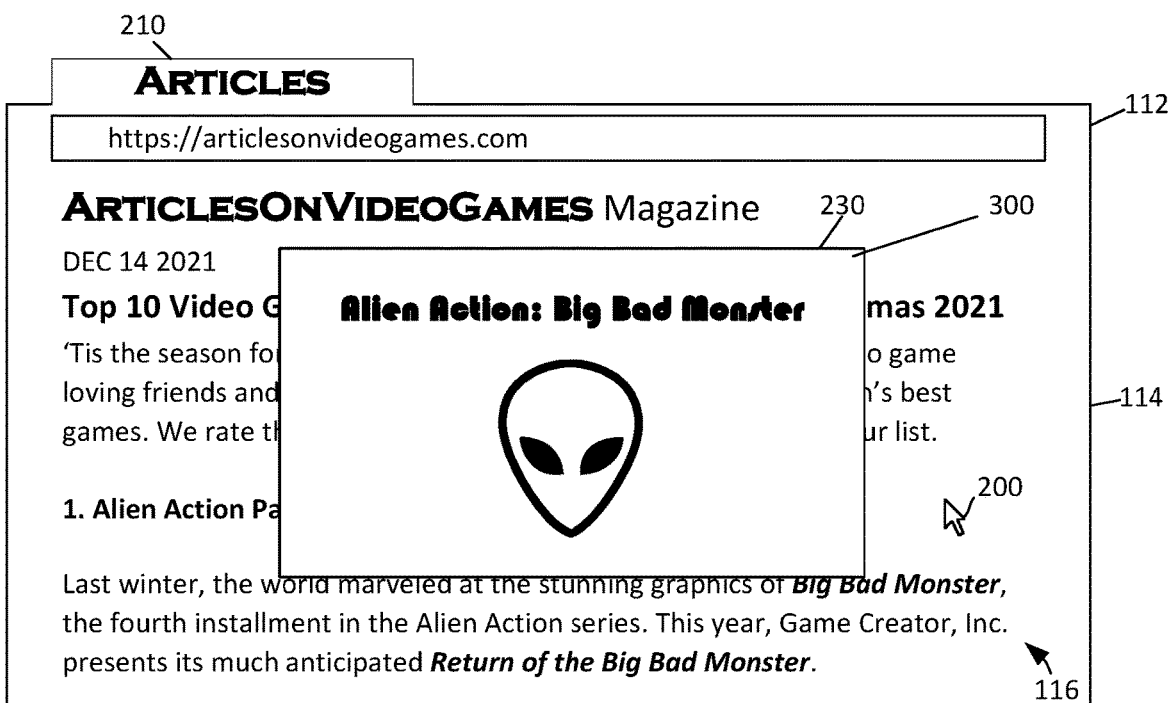
FIG. 3B depicts another example webpage displayed by the browser.

FIG. 3B depicts a second webpage 300 presented within the popup interface 230. In some examples, selection of the play now button 234 in the popup interface 230 does not cause the second website 300 to load in separate tab 310 or window of the browser 112, such as in FIG. 3A. Instead, the second web site 300 may load in the popup interface 230 itself, as depicted in FIG. 3B. When the second website 300 loads in the popup interface 230, the matching media content may be immediately playable or begin playing. For example, where the matching media content is a movie, the movie may begin playing within the popup interface 230. The second webpage 300 may also be in effect a remotely stored version of the matching media that is retrievable via a URL or web address. Accordingly, upon selection of the play now button 234, the matching media content may be fetched via a URL and played within the popup interface 230 (or a separate tab or window as shown in FIG. 3A). In some examples, the second webpage 300, may display a preview, instead of the full content, of the matching media content within the popup interface 230.

The popup interface 230 may also be movable or resizable. For example, based on received user input, the popup interface 230 may be moved or resized. In other examples, the popup interface 230 may automatically move or resize based on the occurrence of particular events. For instance, in examples where the media plays within the popup interface 230, a selection of the Play Now element 234 may cause the popup interface 230 to expand, such as to grow by at least 25% or 50%, to allow for greater visibility of the media playing in the popup interface 230. Additionally or alternatively, a selection of the Play Now element 234 may cause the popup interface 230 to move to, or towards, a corner or a perimeter of the browser window help prevent occluding a central portion of the displayed web page while the media plays in the popup interface 230.

To achieve such resizing and movability functionality, the popup window 230 may be a separate interface window managed by the web browser 112 and configured to remain on top of a primary display area that displays the first webpage 114. For instance, the popup window 230 may not be a traditional iFrame. Rather, the popup interface 230 may be a floating mini window that displays another webpage that is rendered by the web browser 112. In other words, the popup interface 230 may be a new browser-implemented window (e.g., a new browser user interface feature) that opens up over less than an entirety of the first webpage 114.

Figure 4:
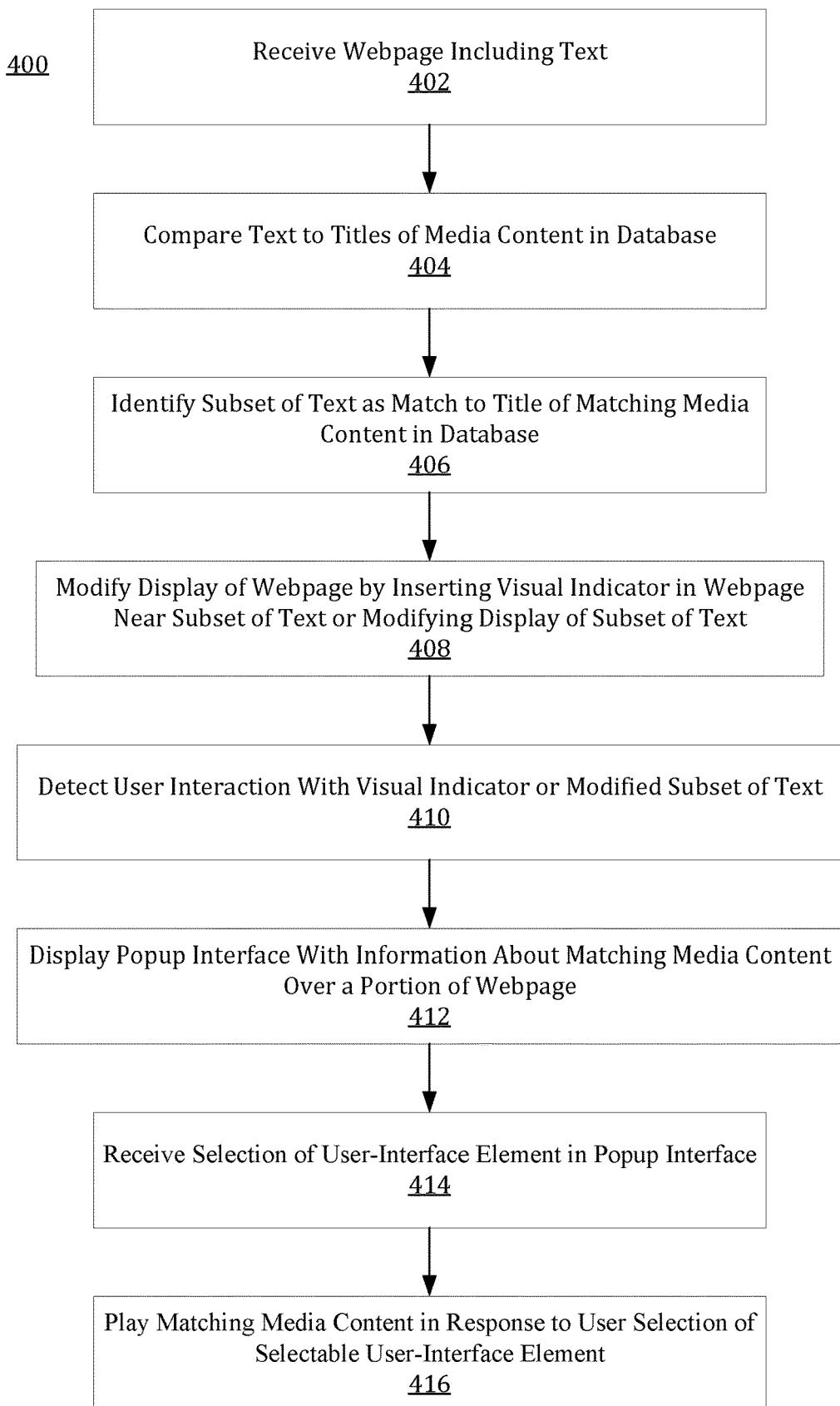
FIG. 4 is a flowchart depicting an example method for identifying and displaying content in a webpage.

FIG. 4 is a flowchart depicting an example method 400 for identifying and displaying content in a webpage. The operations of method 400 may be performed by a web browser and/or the computing device, or components thereof, on which the web browser operates. For example, the memory of the computing device may store instructions that, when executed by the processor of the computing device, cause the computing device to perform the operations of method 400.

At operation 402, a webpage is received by the web browser. For example, the webpage may be received from a web server. The received webpage includes text in the webpage. Operation 402 may also include displaying the received webpage, such as in a primary display area of the web browser.

At operation 404, the text of the webpage is compared to titles of media content in a media content database. The media content may be available from a remote server, such as the media content provider. For instance, where the media content includes video games, the remote server may provide video game playing (e.g., a web-based gaming experience), and where the media content includes movies, the remote server may provide a video streaming service.

As an example, the text of the webpage may be scanned to extract the text and compare the text to the titles of the media content. The titles of the media content may be stored locally by the web browser and/or local computing device. In some examples, the titles of the media content may be downloaded and updated at a regular cadence such as in response to a query or from a push from the remote server, such as the media content provider.

At operation 406, based on the comparison performed in operation 404, a subset of the text is identified as a match to a title of media content in the media content database. The content corresponding to the matched title may be referred to as the matching media content and the corresponding subset of text may be referred to as the matching subset of text.

Based on the identification of the matching subset of text, the display of the webpage is modified in operation 408. For instance, the display of the matching subset of text may be modified and/or a visual indicator may be inserted into the display of the webpage. Modification of the matching subset of text may be to modify the matching subset of text have appearance properties that are the same as those used for other hyperlinks on the displayed webpage. In visual indicator may be an icon or image that is inserted proximate the matching subset of text. For instance, the visual indicator may be inserted inline before or after the matching subset of text.

Modification of the display of the webpage also includes adding additional functionality to the portion(s) of the webpage that are modified, such as the modified subset of text and/or the visual indicator. For example, on-hover functionality or on-click functionality may be added to make the modified subset of text and/or the visual indicator interactive.

Modifying the display of webpage may be accomplished by modifying at least one of: a document object model (DOM) of the webpage, a hypertext markup language (HTML) of the webpage, and/or an extensible markup language (XML) of the webpage. Modifying the display of the webpage also does may not modify a remotely stored version of the webpage, such as the version of the webpage stored on the web server.

At operation 410, a user interaction with the visual indicator and/or the modified subset of text is detected. Detection of the user interaction may be a detection a user-controlled input, such as a hover of a cursor or long press interaction. In other examples, the user interaction may include a click or selection. For instance, a hover or a click on the visual indicator may result in the same behavior (e.g., generating a pop-up window). However, a click on the modified subset of text may generate a different response than a hover over the modified subset of text.

Based on detecting the user interaction in operation 410, a popup interface is displayed by the web browser in operation 412. For instance, when a hover over the modified subset of text or a click or hover of the visual indicator is detected, the web browser may display a popup interface. The popup interface may be displayed over a portion of the webpage, such as proximate the modified subset of text and/or visual indicator. The popup interface includes additional data about the matching media content, such as the title, description, users currently playing the matching media content, etc. The additional information in the popup interface may be received from a separate web site from the one being displayed in the primary display area of the browser.

For instance, the additional information may be from a product detail page (PDP) for the matching media content. The popup interface also includes a selectable user interface element (e.g., a Play Now button) to play the matching media content.

At operation 414, a selection of the user-interface element in the popup interface is received. In response to receiving the selection, the matching media content is played at operation 416. Playing the matching media content may include playing the matching media content within the popup interface. In other examples, the playing the matching media content may include opening a new browser window or browser tab where the media is played. In some examples, the new tab or window may display a webpage from the corresponding media content provider that is providing the matching media content.

Figure 5:
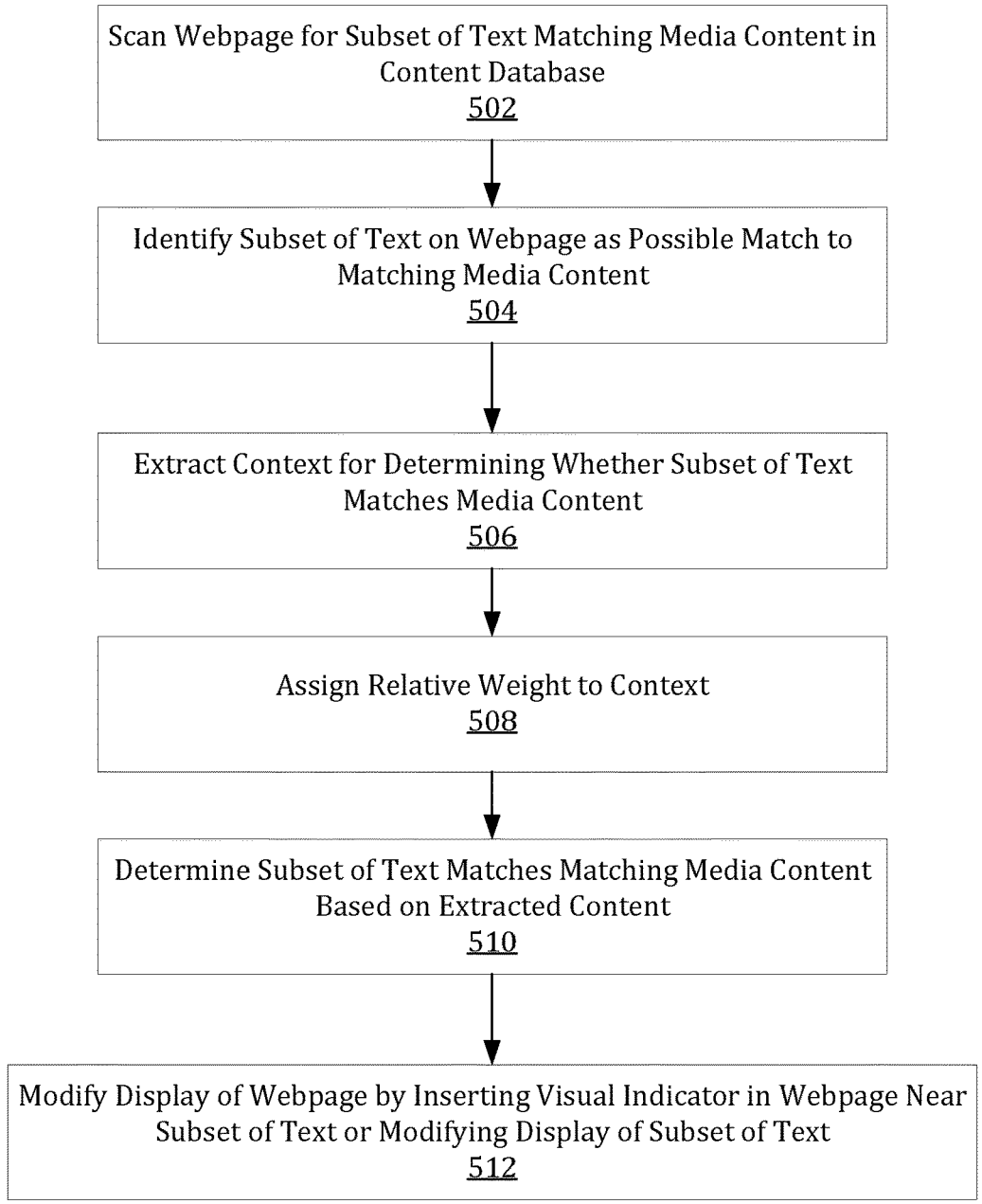
FIG. 5 is a flowchart depicting another example method for identifying and displaying content in a webpage.

FIG. 5 is a flowchart depicting another example method 500 for identifying and displaying content in a webpage. Similar to the method 400 discussed above, the operations of method 500 may be performed by a web browser and/or the computing device, or components thereof, on which the web browser operates. For example, the memory of the computing device may store instructions that, when executed by the processor of the computing device, cause the computing device to perform the operations of method 500.

At operation 502, a webpage is scanned for a subset of text that matches media content in a media content database. For instance, the text of the webpage is compared to a list of titles or descriptors of the media content. At operation 504, a subset of text on the webpage is identified as a possible match to media content in the media content database. For example, the subset of text may match a portion of a title of media content, but not the whole title of the media content. As such, the subset of text is a possible match, but there is a chance that the text does not in fact match or indicate the potentially matching media content. In other examples, the subset of text matches the title of the media content but there is ambiguity as to whether the subset of text is referring to the media content of the media database or another topic or subject. For instance, the subset of text may state "Halo," which may be the title of a popular song, a popular video game, or a head adornment for an angel.

At operation 506, context is extracted for determining whether the possibly matching or candidate subset of text is actually a match to the corresponding media content. The context may include text surrounding the candidate subset of text, keywords and/or entities extracted from the webpage, the type of webpage, the webpage domain, an identified platform associated with the webpage, an address of the webpage, a header of the webpage, a title of the webpage, data associated with a cookie stored by the web browser, or data associated with a browsing history stored by the web browser, etc. The extracted context the extracted content may indicate whether the candidate subset of content is referring to the corresponding media content. As an example, extracted content may be analyzed based on the type of media content for which there is a possible match (e.g., the type of media content in the media database). For instance, where the media content is a video game, the context may be analyzed to determine if there are video-game-related terms on the webpage and/or in the text surrounding the subset of text. Such video-game-related terms may include brand names of known video game products, such as XBOX, or the like. Additionally, some website domains may be known to be related to video games. Such a list of known website domains may be stored and therefore recognized by the web browser. In other examples, trained machine learning (ML) models may be run with the contents of the webpage as an input to output a type of website or a binary output indicating whether the webpage relates to video games (or the particular media content type in question).

Each type of context (e.g., surrounding text, domain type) may be assigned a corresponding context score. For example, each video-game-related term in the text may be assigned a context score of 10 and a video-game website domain may be assigned a context score of 20. Accordingly, for a webpage that has 3 video-game related terms in the surrounding text and the webpage has a video-game web site domain, the total context score for the webpage is 50. As another example, for a webpage that has 2 video-game related terms in the surrounding text and the webpage does not have a video-game web site domain, the total context score for the webpage is 20. As should be appreciated, different score values and additional context types may be used in other examples.

At operation 508, relative weights may be assigned to the extracted context. For instance, based on the position/location of particular types of context, weights may be assigned to the context. Continuing with the example of video-game related terms in the surrounding text discussed above, the context score of those video-game related terms may be weighted based on their proximity to the candidate subset of text. For instance, if the video-game related term is within the same sentence as the subset of text, a highest weight (e.g., 100%) may be assigned. If the video-game related term is within the same paragraph, but not the same sentence, as the subset of text, a medium weight (75%) may be assigned. If the video-game related term is on the page, but not in the same paragraph, a lowest weight (e.g., 50%) may be assigned. As an illustrative example where each video-game related term is assigned a context score of 10, for a webpage with one video-game related term in the same sentence as the subset of text and one video-game related term in the same paragraph, but not the same sentence, as the video-game related term, the total context score for the webpage is 17.5.

At operation 510, based on the extracted content and any potential assigned weights, a determination is made that the candidate subset of text is an actual match to the matching media content. For example, if a total context score for the webpage and/or the candidate subset of text exceeds a context threshold, the candidate subset of text may be determined to be an actual match to the matching media content. In contrast, if the total context score is below the context threshold, the candidate subset of text may be determined to not be an actual match to the media content.

At operation 512, based on determining that the subset of text is an actual match to the matching media content, the display of the webpage is modified. The operation of modifying the webpage may be the same as operation 408 discussed above with respect to FIG. 4. In addition, method 500 may also include operations similar to operations 414-416 in method 400 to provide the interactive responses of the modified webpage.

As should be appreciated from the foregoing, In an aspect, the technology relates to a computer-implemented method, performed by a web browser, for identifying and displaying content. The method includes receiving, by the web browser, a first webpage including text; comparing the text to titles of media content in a media content database, wherein the media content comprises at least one of a video game, a movie, or a song; based on the comparison, identifying a subset of text as a match to a title of a matching media content in the media content database; and based on identifying the subset of text, modifying a display of the first webpage by performing at least one of: inserting a visual indicator into the first webpage in proximity to the subset of text; or modifying the display of the subset of text. The method further includes detecting an interaction of a user-controlled input with the inserted visual indicator or the modified display of the subset of text; and based on detecting the interaction, displaying a popup interface over a portion of the first webpage, the popup interface displaying additional information about the matching media content and a selectable user-interface element to play the matching media content.

In an example, the method further includes receiving a selection of the selectable user-interface element in the popup interface; and in response to receiving the selection, playing the matching media content. In still another example, playing the matching media content includes launching a new browser tab or new browser window displaying a second webpage in which the media content is played. In yet another example, the additional information displayed in the popup interface is received from an external source other than the first webpage or the second webpage. In still another example, playing the matching media content includes playing the matching content in the popup interface. In a further example, the identifying the subset of text as a match includes determining that a percentage of letters or words in the subset of text matches the letters or words in the title of the matching media content. In still yet another example, the identifying the subset of text as a match further includes identifying context from the first webpage.

In another example, the context includes at least one of: additional text surrounding the subset of text, from the first webpage, an identified platform associated with the first webpage, an address of the first webpage, a header of the first webpage, a title of the first webpage, data associated with a cookie stored by the web browser, or data associated with a browsing history stored by the web browser. In yet another example, the method further includes assigning a relative weight to the context based on proximity of the context to the identified subset of text. In still another example, the visual indicator comprises an icon inserted before or after the subset of text. In a further example, modifying the display of the first webpage includes modifying at least one of: a document object model (DOM) of the first webpage, a hypertext markup language (HTML) of the first webpage, or an extensible markup language (XML) of the first webpage.

In another aspect, the technology relates to a system for identifying and displaying content in a webpage. The system includes a processor; and memory storing computer-useable instructions that, when executed by the processor, causes the processor to perform operations. The operations include receiving, by a web browser, a first webpage comprising text; comparing the text to titles of media content in a media content database, wherein the media content comprises at least one of a video game, a movie, or a song; based on the comparison, identifying a subset of text as a match to a title of a matching media content in the media content database; and based on identifying the subset of text, modifying a display of the first webpage by performing at least one of: inserting a visual indicator into the first webpage in proximity to the subset of text; or modifying the display of the subset of text. The operations also include detecting an interaction of a user-controlled input with the inserted visual indicator or the modified display of the subset of text; and based on detecting the interaction, displaying a popup interface over a portion of the first webpage, the popup interface displaying additional information about the matching media content and a selectable user-interface element to play the matching media content.

In an example, the operations further include: receiving a selection of the selectable user-interface element in the popup interface; and in response to receiving the selection, playing the matching media content. In another example, playing the matching media content includes launching a new browser tab or new browser window displaying a second webpage in which the media content is played. In still another example, the additional information displayed in the popup interface is received from an external source other than the first webpage or the second webpage.

In another aspect, the technology relates to a computer-implemented method, performed by a web browser, for identifying and displaying content. The method includes scanning, by the web browser, a first webpage for a subset of text that matches a media content associated with a content database; identifying, by the web browser, the subset of text on the first webpage as a possible match to a matching media content of the content database; extracting, from the first webpage, context for determining whether the subset of text is a match to the matching media content; based on the extracted context, determining that the subset of text matches the matching media content; and based on determining that the subset of text matches the matching media content, modifying a display of the first webpage by performing at least one of: inserting a visual indicator into the first webpage in proximity to the subset of text; or modifying the display of the subset of text.

In an example, the context comprises one of: additional text surrounding the subset of text, a header of the first webpage, or a title of the first webpage; and a relative weight assigned to context, by the web browser, decreases as a distance between the context and the subset of text increases. In a further example, the context includes one of: an identified platform associated with the first webpage or an address of the first webpage. In yet another example, the method further includes detecting an interaction of a user-controlled input with the inserted visual indicator or the modified display of the subset of text; and based on detecting the interaction, displaying a popup interface over a portion of the first webpage, the popup interface displaying additional information about the matching media content and a selectable user-interface element to play the matching media content. In still another example, a most recent version of a media content series from the media content database is selected, by the browser, as the matching media content based on determining that the subset of text matches two or more titles of matching media content.

Aspects of the present disclosure, for example, are described above with reference to block diagrams and/or operational illustrations of methods, systems, and computer program products according to aspects of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

What is claimed is:

1. A system for identifying and displaying content in a webpage, the system comprising:
    a processor; and
    memory storing computer-useable instructions that, when executed by the processor, causes the processor to perform operations comprising:
        receiving, by a web browser, first webpage content of a first webpage;
        comparing the first webpage content to media content in a media content database, wherein the media content comprises at least one of a video game, a movie, or a song;
        based on the comparison, identifying a match in the first webpage content to matching media content in the media content database;
        based on identifying the match, displaying a visual indicator indicating that the matching media content has been identified;
        detecting an interaction of a user-controlled input with the displayed visual indicator;
        based on detecting the interaction, displaying an interface concurrently with the first webpage, the interface displaying additional information about the matching media content and a selectable user-interface element;
        receiving a selection of the selectable user-interface element in the interface; and
        in response to receiving the selection, causing a new browser tab or new browser window displaying a second webpage for playing the matching media.

2. The system of claim 1, wherein the additional information displayed in the interface is received from an external source other than the first webpage and the second webpage.

3. The system of claim 1, wherein the identifying the match comprises determining that a percentage of letters or words in the first webpage content matches the letters or words in a title of the matching media content.

4. The system of claim 1, wherein the identifying the match further comprises identifying context from the first webpage, wherein the context comprises at least one of: additional text surrounding the matching content, an identified platform associated with the first webpage, an address of the first webpage, a header of the first webpage, a title of the first webpage, data associated with a cookie stored by the web browser, or data associated with a browsing history stored by the web browser.

5. The system of claim 4, further comprising assigning a relative weight to the context based on proximity of the context to the matching content of the first webpage content.

6. The system of claim 1, wherein the visual indicator comprises an icon inserted before or after the first webpage content identified as the match.

7. The system of claim 1, wherein displaying the visual indicator includes modifying at least one of: a document object model (DOM) of the first webpage, a hypertext markup language (HTML) of the first webpage, or an extensible markup language (XML) of the first webpage.

8. The system of claim 1, wherein the user-controlled input with the displayed visual indicator is a selection of the visual indicator.

9. A computer-implemented method, performed by a web browser, for identifying and displaying content, the method comprising:
    receiving first webpage content of a first webpage;
    comparing the first webpage content to media content in a media content database, wherein the media content comprises at least one of a video game, a movie, or a song;
    based on the comparison, identifying a match in the first webpage content to matching media content in the media content database;
    based on identifying the match, displaying a visual indicator indicating that the matching media content has been identified;
    detecting an interaction of a user-controlled input with the displayed visual indicator;
    based on detecting the interaction, displaying an interface concurrently with the first webpage, the interface displaying additional information about the matching media content and a selectable user-interface element;
    receiving a selection of the selectable user-interface element in the interface; and
    in response to receiving the selection, causing a new browser tab or new browser window displaying a second webpage for playing the matching media.

10. The method of claim 9, wherein the identifying the match comprises determining that a percentage of letters or words in the first webpage content matches the letters or words in a title of the matching media content.

11. The method of claim 9, wherein the identifying the match further comprises identifying context from the first webpage, wherein the context comprises at least one of: additional text surrounding the matching content, an identified platform associated with the first webpage, an address of the first webpage, a header of the first webpage, a title of the first webpage, data associated with a cookie stored by the web browser, or data associated with a browsing history stored by the web browser.

12. The method of claim 11, wherein the context comprises at least one of: the address of the first webpage or the title of the first webpage.

13. The method of claim 11, wherein the context comprises at least one of: the data associated with the cookie stored by the web browser or the data associated with the browsing history stored by the web browser.

14. The method of claim 9, wherein the visual indicator comprises an icon inserted before or after the first webpage content identified as the match.

15. The method of claim 9, wherein the user-controlled input with the displayed visual indicator is a selection of the visual indicator.

16. The method of claim 9, wherein displaying the visual indicator includes modifying at least one of: a document object model (DOM) of the first webpage, a hypertext markup language (HTML) of the first webpage, or an extensible markup language (XML) of the first webpage.

17. A computer-implemented method, performed by a web browser, for identifying and displaying content, the method comprising:
receiving first webpage content of a first webpage;
comparing the first webpage content to media content in a media content database, wherein the media content comprises at least one of a video game, a movie, or a song;
based on the comparison and context of the first webpage, identifying a match in the first webpage content to matching media content in the media content database;
based on identifying the match, displaying a visual indicator indicating that the matching media content has been identified by modifying at least one of: a document object model (DOM) of the first webpage, a hypertext markup language (HTML) of the first webpage, or an extensible markup language (XML) of the first webpage;
detecting an interaction of a user-controlled input with the displayed visual indicator;
based on detecting the interaction, displaying an interface concurrently with the first webpage, the interface displaying additional information about the matching media content and a selectable user-interface element;
receiving a selection of the selectable user-interface element in the interface; and
in response to receiving the selection, causing a new browser tab or new browser window displaying a second webpage for playing the matching media.

18. The method of claim 17, wherein the user-controlled input with the displayed visual indicator is a selection of the visual indicator.

19. The method of claim 17, wherein the visual indicator comprises an icon inserted before or after the first webpage content identified as the match.

20. The method of claim 17, wherein the context comprises at least one of: additional text surrounding the matching content, an identified platform associated with the first webpage, an address of the first webpage, a header of the first webpage, a title of the first webpage, data associated with a cookie stored by the web browser, or data associated with a browsing history stored by the web browser.

* * * * *